(12) United States Patent
Level et al.

(10) Patent No.: US 11,905,024 B2
(45) Date of Patent: Feb. 20, 2024

(54) ELECTRIC PROPULSION ARCHITECTURE FOR A MULTI-ROTOR VERTICAL TAKE-OFF AND LANDING AIRCRAFT AND METHOD FOR CONTROLLING SUCH AN ARCHITECTURE

(71) Applicant: SAFRAN, Paris (FR)

(72) Inventors: Clélia Level, Moissy-Cramayel (FR); Christophe Maury, Moissy-Cramayel (FR); René Meunier, Moissy-Cramayel (FR); Bruno Thoraval, Moissy-Cramayel (FR)

(73) Assignee: SAFRAN, Paris (FR)

( * ) Notice: Subject to any disclaimer, the term of this patent is extended or adjusted under 35 U.S.C. 154(b) by 101 days.

(21) Appl. No.: 17/624,669

(22) PCT Filed: Jul. 8, 2020

(86) PCT No.: PCT/FR2020/051213
§ 371 (c)(1),
(2) Date: Jan. 4, 2022

(87) PCT Pub. No.: WO2021/005304
PCT Pub. Date: Jan. 14, 2021

(65) Prior Publication Data
US 2022/0274711 A1 Sep. 1, 2022

(30) Foreign Application Priority Data
Jul. 9, 2019 (FR) ........................................ 1907667

(51) Int. Cl.
*B64D 27/24* (2006.01)
*B64C 29/00* (2006.01)
(Continued)

(52) U.S. Cl.
CPC .............. *B64D 27/24* (2013.01); *B64C 29/00* (2013.01); *B64D 31/00* (2013.01); *B64D 35/06* (2013.01); *B64D 35/08* (2013.01)

(58) Field of Classification Search
CPC ........ B64D 27/24; B64D 31/00; B64D 35/06; B64D 35/08; B64C 29/00; B64U 50/19; Y02T 50/60
See application file for complete search history.

(56) References Cited

U.S. PATENT DOCUMENTS

2017/0203839 A1 * 7/2017 Giannini ................ B64D 27/24

FOREIGN PATENT DOCUMENTS

| EP | 3 208 909 A1 | 8/2017 |
| WO | 2017/114643 A1 | 7/2017 |

(Continued)

OTHER PUBLICATIONS

International Search Report dated Sep. 15, 2020, issued in corresponding International Application No. PCT/FR2020/051213 filed Jul. 8, 2020, 5 pages total.

(Continued)

*Primary Examiner* — Assres H Woldemaryam
(74) *Attorney, Agent, or Firm* — CHRISTENSEN O'CONNOR JOHNSON KINDNESS PLLC

(57) ABSTRACT

An electric propulsion architecture for a multi-rotor vertical take-off and landing aircraft includes four electric generators; and four pairs of rotors. For each rotor, a first electric motor is configured to operate in an active mode, and a second electric motor is configured to be in a standby mode and being able to operate in an active mode in a breakdown situation. A propeller is coupled to the electric motors, wherein, for each pair of rotors, one of the electric generators powers the first electric motors, and another of the electric generators powers the second electric motors. The (Continued)

rotors form counter-rotors and for each counter-rotor, the electric motors are each powered by one of the four electric generators so that the four electric generators power the electric motors of the rotors of each counter-rotor.

10 Claims, 3 Drawing Sheets

(51) Int. Cl.
     *B64D 31/00*      (2006.01)
     *B64D 35/06*      (2006.01)
     *B64D 35/08*      (2006.01)

(56) References Cited

FOREIGN PATENT DOCUMENTS

WO     WO-2017114643 A1 * 7/2017
WO     WO-2020225510 A1 * 11/2020   ............ B60L 50/40

OTHER PUBLICATIONS

Written Opinion dated Sep. 15, 2020, issued in corresponding International Application No. PCT/FR2020/051213 filed Jul. 8, 2020, 6 pages.
English translation of Written Opinion dated Sep. 15, 2020, issued in corresponding International Application No. PCT/FR2020/051213, filed Jul. 8, 2020, 6 pages.
International Preliminary Report on Patentability dated Jan. 11, 2022, issued in corresponding International Application No. PCT/FR2020/051213, filed Jul. 8, 2020, 7 pages.

* cited by examiner

ELECTRIC PROPULSION ARCHITECTURE FOR A MULTI-ROTOR VERTICAL TAKE-OFF AND LANDING AIRCRAFT AND METHOD FOR CONTROLLING SUCH AN ARCHITECTURE

FIELD OF THE DISCLOSURE

The disclosure relates to an electric propulsion architecture for a multi-rotor Vertical Take-Off and Landing (VTOL) aircraft comprising at least two electric motors per rotor of the helicopter, one operating in an active mode and the other in a standby mode, and to a method for controlling such an architecture.

BACKGROUND

The prior art comprises in particular the documents US-A1-2017/203839, EP-A1-3 208 909 and WO-A1-2017/114643.

It is known that aircraft can be used in urban areas. However, this use of aircraft imposes strict objectives in terms of safety and pollutant and noise emissions.

The single-rotor helicopters comprising a single electric motor for the rotor and have vertical take-off and landing capabilities. However, the conventional architectures of these helicopters do not meet safety and emissions objectives. An architecture is the definition of an installation.

The distributed propulsion architectures for such helicopters are, however, essential to ensure that objectives are met in the event of a breakdown. In addition, the electrical distribution of such helicopters is necessary for problems of mass.

There are also multi-rotor aircraft comprising a single electric motor per rotor.

However, the conventional architectures of these aircraft comprising a single electric motor per rotor does not allow to be robust to double electrical breakdown.

In addition, reconfigurations in the electrical network of the helicopter or the aircraft increase the amount of distribution elements in the electrical core of the helicopter or of the aircraft, in particular adding contactors. This results in an increase in the complexity and the mass of the electric propulsion system of the helicopter or of the aircraft.

The purpose of the disclosure is to propose a solution to remedy at least some of these disadvantages.

In particular, the present disclosure proposes an electric propulsion multi-rotor vertical take-off and landing aircraft that allows to satisfy the requirements of safety and pollutant and noise emissions in urban environments.

SUMMARY

The present disclosure proposes, in order to address the issues of weight and dual electrical breakdown, a multi-rotor vertical take-off and landing aircraft comprising more than one electric motor per rotor of the aircraft. Advantageously, the disclosure does not propose a heavy and complex reconfiguration of the electric propulsion system.

To this end, the disclosure relates to an electric propulsion architecture for a multi-rotor vertical take-off and landing aircraft, comprising:
at least four electric generators,
at least four pairs of rotors,
for each rotor, a first electric motor and a second electric motor, the first electric motor being configured to operate in an active mode and the second electric motor being configured to be in a standby mode and being adapted to operate in an active mode in a breakdown situation,
for each rotor, a propeller coupled to the first and second electric motors so that during operation the first electric motor drives the propeller,
wherein for each pair of rotors, one of the electric generators supplies the first electric motors of the rotors of a pair of rotors, and another of the electric generators supplies the second electric motors of the rotors of a pair of rotors,
and wherein the rotors form counter-rotors, and for each counter-rotor, the first and second electric motors of the rotors of each counter-rotor are each supplied by one of the four electric generators, so that the four electric generators supply the first and second electric motors of the rotors of each counter-rotor.

According to the disclosure, a pair of rotors comprises two rotors that are paired to the same power source, in this case two electric generators.

According to the disclosure, a counter-rotor comprises two rotors whose propellers rotate in opposite directions.

Advantageously, in the architecture according to the disclosure, each rotor is adapted to be supplied with power by two electric motors. In fact, the first electric motor supplies the rotor in nominal operation, and the second electric motor is adapted to supply the rotor in degraded operation.

Thus, the architecture according to the disclosure is referred to as "dual motor rotor" architecture, meaning architecture with two motors per rotor.

According to the disclosure, each rotor can be supplied by two electric generators, and each pair of rotors can be supplied by two electric generators.

The eight rotors are grouped into four counter-rotors, each of which is supplied by the four electric generators. Thus, four electric motors supplied by a single electric generator can belong to four different counter-rotors.

The first electric motor operates in an active mode, and the second electric motor is in standby mode. The second electric motor is adapted to operate in nominal mode, i.e., it can be activated by taking it out of the standby mode in a breakdown situation.

In active mode, an electric motor supplies a rotor.

In standby mode, an electric motor does not supply the rotor.

In contrast to a two electric motors in active mode configuration that provides an active redundancy, having one electric motor in active mode and one electric motor in standby mode supplying a rotor allows to provide a better segregation between the redundant power chains and to improve the detectability of the faults, in particular when redundant actuators intervening within servo loops are summed in force or torque.

In the event of a breakdown of a first electric motor of a rotor, of a rotor or of an electric generator, the second electric motor of each rotor can be switched to operate in active mode. Thus, all the second electric motors are taken out of the standby mode and activated in case of a breakdown in the architecture.

In this case, during operation, the first and second electric motors drive the propeller. Thus, in case of breakdown, there is advantageously a double activation of all the electric motors, which allows a robustness to the double electric breakdown, without switching of the sources.

In particular, the aircraft equipped with an architecture according to the disclosure can continue to fly in case of loss of one rotor, or even two paired rotors.

This advantageously allows the aircraft to be able to complete its flight in the event of a degraded situation, without having to oversize the electric motors or double the total power installed in the aircraft.

According to the disclosure, the rotors form counter-rotors which are each supplied with electrical energy by a plurality, for example four, electric generators, the electric generators being segregated.

This advantageously allows a robustness in nominal performance to the single electrical breakdown, as well as a robustness in degraded performance to the double electrical breakdown or the loss of a rotor. This also allows for an avoidance of the reconfigurations through the power channel segregation, and a minimized failure common mode through the passive redundancy in nominal operation.

Advantageously, there is total electrical segregation between the power chains, i.e., between the electric generators and the electric motors of the rotors. Thus, there is no transfer of electrical energy between one source of electrical energy and another, i.e., between the electric generators or the electric motors. Indeed, there is no contact, no interconnection between the power channels formed by the electric generators.

The architecture may also comprise electrical energy storage means that supply the electric generators, or chemical energy storage means, in case of a turbogenerator. The electric generators may comprise at least one battery, or a fuel cell, or a turbogenerator.

The first and second electric motors of each rotor may have different dimensions. In particular, the first and second electric motors may have different powers. For example, the power of the second electric motor may be between 50% and 80% of the power of the first electric motor, in particular about 60% of the power of the first electric motor. Thus, there is a power asymmetry of the two electric motors supplying a same rotor. This advantageously allows to eliminate the disadvantage of the mass for the redundancy of the electric motors.

The first and second electric motors may be separate from each other. Alternatively, the first and second electric motors are not separate from each other.

The rotors of a pair of rotors may be arranged diagonally opposite in the aircraft.

The counter-rotors may be arranged diagonally opposite with central symmetry in the aircraft.

This particular positioning of the counter-rotors allows, in the event of a breakdown in the architecture, to compensate for the breakdown and to balance the power within the architecture, and thus to allow the aircraft to complete its flight.

The architecture may also comprise communication buses connected between each electric generator and the electric motors that are supplied by that electric generator.

Such a communication bus allows the power from an electric generator to be distributed to the electric motors driven by that electric generator.

The disclosure also relates to an electric propulsion architecture for a multi-rotor vertical take-off and landing aircraft, comprising:

N electric generators, N being an integer greater than or equal to 2,

N pairs of rotors, for each rotor, a first electric motor and a second electric motor, the first electric motor being configured to operate in an active mode and the second electric motor being configured to be in a standby mode and being adapted to operate in an active mode in a breakdown situation, and for each rotor, a propeller coupled to the first and second electric motors so that during operation the first electric motor drives the propeller, wherein for each pair of rotors, one of the N electric generators supplies the first electric motors of the rotors of one pair of rotors, and another of the N electric generators supplies the second electric motors of the rotors of one pair of rotors, and wherein the rotors form counter-rotors, and for each counter-rotor, the first and second electric motors of the rotors of each counter-rotor are each supplied by one of the N electric generators, such that the N electric generators supply the first and second electric motors of the rotors of each counter-rotor.

In the event of breakdown of a first electric motor of a rotor, of a rotor, or of an electric generator, the second electric motor of each rotor is configured to operate in an active mode. In this case, during operation, the first and second electric motors drive the propeller.

The disclosure also relates to a multi-rotor vertical take-off and landing aircraft comprising an electric propulsion architecture according to the disclosure.

The disclosure also relates to a method for controlling an electric propulsion architecture for a multi-rotor vertical take-off and landing aircraft according to the disclosure, comprising the steps consisting of, for each rotor:

operating the first electric motor in an active mode, and
operating the second electric motor in a standby mode.

The method according to the disclosure may also comprise the step consisting of, in the event of a breakdown of a first electric motor of a rotor, of a rotor or of an electric generator, an exit of the operation in a standby mode of the second electric motor of each rotor, and then an operation of the second electric motor of each rotor in an active mode.

Thus, in case of a degraded operation, all the second electric motors in standby mode are activated to compensate for the degraded situation.

The disclosure thus allows, in the event of breakdown, to make it easy to identify which power channel is the cause of the breakdown. This allows to make it easier to detect and isolate a breakdown within the architecture.

DESCRIPTION OF THE DRAWINGS

The disclosure will be better understood and other details, characteristics and advantages of the present disclosure will become clearer from the following description made by way of non-limiting example and with reference to the attached drawings, in which.

DETAILED DESCRIPTION

Figure 1:
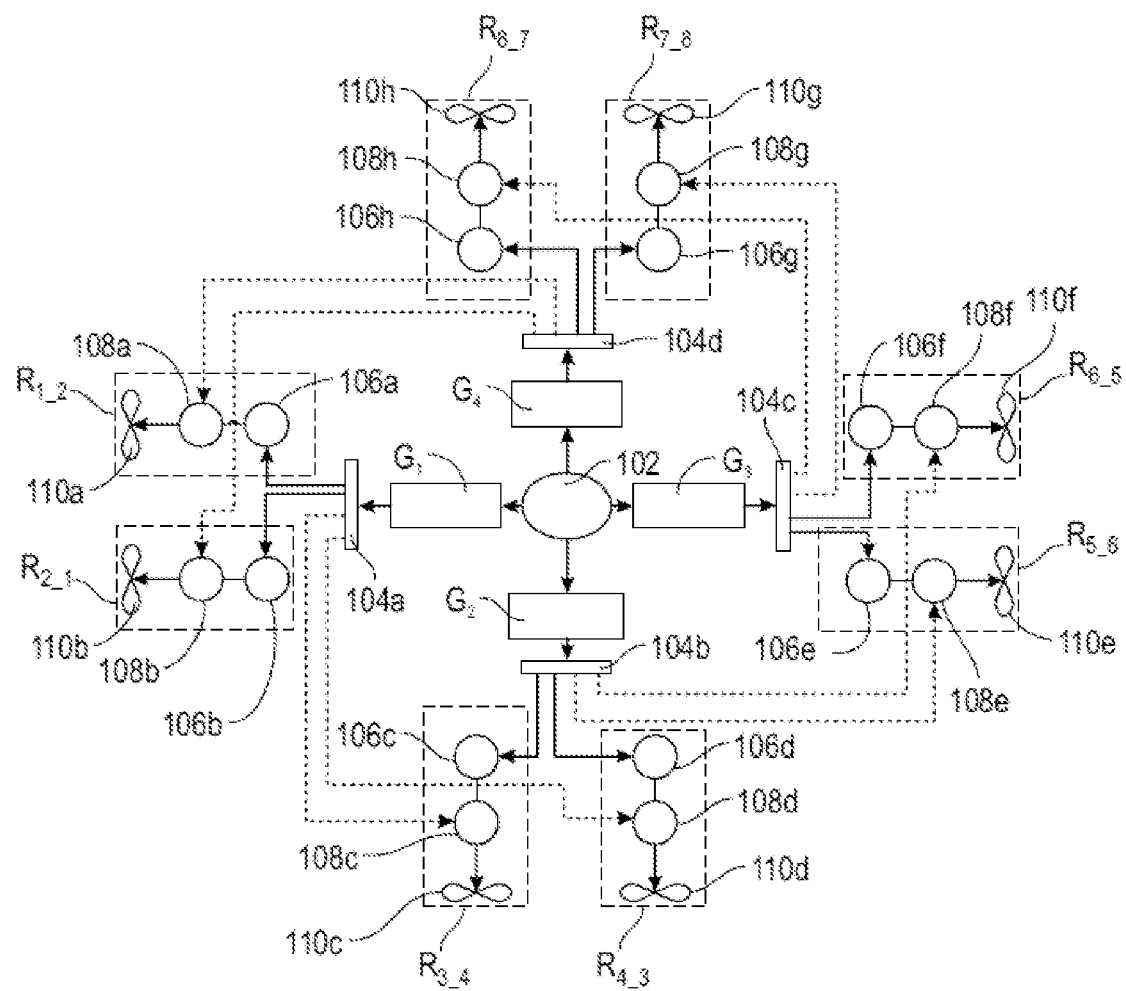
FIG. 1 represents an electric propulsion architecture for a multi-rotor VTOL aircraft according to an embodiment of the disclosure, here a dual motor per rotor architecture for an octocopter.

FIG. 1 shows an electric propulsion architecture for a multi-rotor VTOL aircraft, and more precisely an electric propulsion architecture for an octocopter, i.e., an aircraft with eight lift rotors.

The architecture comprises electrical energy storage means 102 that supply electric generators G1-G4, here four in number.

The electric generators G1-G4 can be batteries, or fuel cells, or turbogenerators.

The electric generators G1-G4 are connected to communication buses 104a-d.

The architecture comprises rotors R1_2, R2_1, R3_4, R4_3, R5_6, R6_5, R7_8 and R8_7, here eight in number. Each rotor comprises two electric motors 106a-h and 108a-h, and a propeller 110a-h. A propeller is coupled to the electric motors of a rotor so that during operation the first electric motor 106a-h drives the propeller.

An electric motor is connected to an electric generator so that during operation the electric generator supplies the electric motor, in particular via a communication bus. Thus, each electric motor is power supplied by an electric generator.

In particular, the communication bus 104a is connected between the electric generator G1 and the electric motors 106a, 106b, 108c, 108d that are supplied by this electric generator.

The communication bus 104b is connected between the electric generator G2 and the electric motors 106c-d, 108e-f which are supplied by this electric generator.

The communication bus 104c is connected between the electric generator G3 and the electric motors 106e-f, 108g-h which are supplied by this electric generator.

And finally, the communication bus 104d is connected between the electric generator G4 and the electric motors 106g-h, 108a-b which are supplied by this electric generator. The first electric motor of each rotor operates in an active mode and the second electric motor of each rotor is in a standby mode. Thus, each rotor is supplied with electrical power by the first electric motor in active mode.

The eight rotors are grouped into pairs of rotor R1_2-R2_1, R3_4-R4_3, R5_6-R6_5 and R7_8-R8_7. For each pair of rotors, the first electric motors of the rotors of a pair of rotors are supplied by one of the electric generators, and the second electric motors of the rotors of a pair of rotors are supplied by another of the electric generators.

For example, the first electric motors 106a-b of the pair of rotors R1_2-R2_1 are supplied by the electric generator G1 and the second electric motors 108a-b of the pair of rotors R1_2-R2_1 are supplied by the electric generator G4.

Similarly, the first electric motors 106c-d of the pair of rotors R3_4-R4_3 are supplied by the electric generator G2 and the second electric motors 108c-d of the pair of rotors R3_4-R4_3 are supplied by the electric generator G1; the first electric motors 106e-f of the pair of rotors R5_6-R6_5 are supplied by the electric generator G3 and the second electric motors 108e-f of the pair of rotors R5_6-R6_5 are supplied by the electric generator G2; and the first electric motors 106g-h of the pair of rotors R7_8-R8_7 are supplied by the electric generator G4, and the second electric motors 108g-h of the pair of rotors R7_8-R8_7 are supplied by the electric generator G3.

The eight rotors are grouped into four counter-rotors, each supplied by four electric generators. For example, the rotors R1_2 and R6_5 form a counter-rotor supplied by the electric generators G1-G4. Similarly, the rotors R2_1 and R5_6 form a counter-rotor supplied by the electric generators G1-G4; the rotors R8_7 and R3_4 form a counter-rotor supplied by the electric generators G1-G4; and the rotors R7_8 and R4_3 form a counter-rotor supplied by the electric generators G1-G4.

Figure 2:
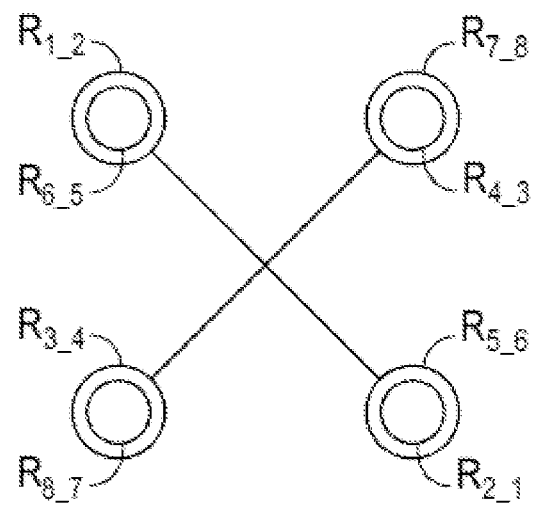
FIG. 2 shows a configuration of the rotors for the dual motor per rotor architecture for an octocopter of FIG. 1.
Figure 3:
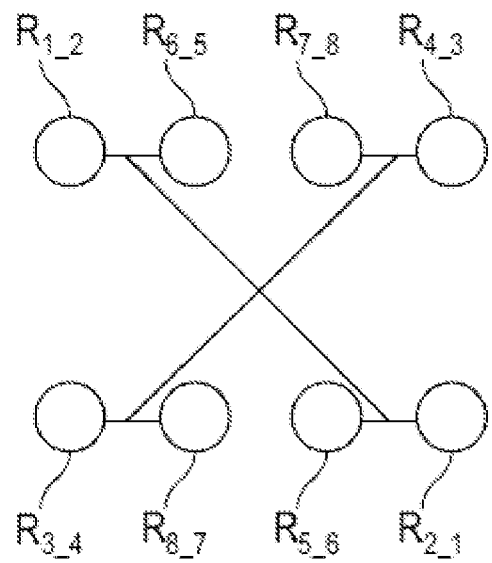
FIG. 3 shows another configuration of the rotors for the dual motor per rotor architecture for an octocopter of FIG. 1.

The counter-rotors can be diagonally opposed, with a central symmetry. For example, as shown in FIGS. 2 and 3, the counter-rotor R1_2-R6_5 is opposite the counter-rotor R5_6-R2_1; and the counter-rotor R3_4-R8_7 is opposite the counter-rotor R4_3-R7_8.

The rotors of a pair of rotors may be diagonally opposed and have opposite directions of rotation. For example, as shown in FIGS. 2 and 3, the pairs of rotors R1_2-R2_1, R3_4-R4_3, R5_6-R6_5 and R7_8-R8_7 are diagonally opposite each other.

Each rotor can be supplied by two electric generators, each electric generator supplying one of the electric motors of the rotor. Each pair of rotors can be supplied by two electric generators. For example, the rotors R1_2 and R2_1 form a pair of rotors supplied by the electric generators G1, G4. Similarly, the rotors R3_4 and R4_3 form a pair of rotors supplied by the electric generators G1, G2; the rotors R5_6 and R6_5 form a pair of rotors supplied by the electric generators G2, G3; and the rotors R7_8 and R8_7 form a pair of rotors supplied by the electric generators G3, G4.

The four electric motors supplied by an electric generator can belong to four different counter-rotors. For example, the electric generator G1 supplies an electric motor of each of the four counter-rotors R1_2-R6_5, R2_1-R5_6, R3_4-R8_7 and R4_3-R7_8. Similarly, the electric generator G2 supplies an electric motor of each of the four counter-rotors R3_4-R8_7, R4_3-R7_8, R5_6-R2_1 and R6_5-R1_2; the electric generator G3 supplies an electric motor of each of the four counter-rotors R5_6-R2_1, R6_5-R1_2; R7_8-R4_3 and R8_7-R3_4; and the electric generator G4 supplies an electric motor of each of the four counter-rotors R7_8-R4_3, R8_7-R3_4, R1_2-R6_5 and R2_1-R5_6.

A rotor is supplied with power by two electric motors, a first electric motor being in active mode and a second electric motor being in standby mode.

In nominal operation, only the first electric motor in active mode supplies the rotor. In the event of a breakdown of a first electric motor, of a rotor or of an electric generator, there is a double activation of the electric motors. In other words, in the event of a breakdown, each rotor can be power supplied by two electric motors. More precisely, to compensate for the loss of power supply to a rotor via its electric motor in active mode, all the electric motors in "standby" mode are activated and supplied by the associated electric generator. Thus, in the event of a breakdown, the electric motors operate in active/active mode, and no longer in active/standby mode.

The electric motors in active mode and in standby mode are supplied by two segregated electric generators. Thus, the loss of an electric generator does not imply the loss of any rotor. In fact, in case of loss of the electric generator G1, the electric motors 108a-b supply the rotors R1_2 and R2_1, and the electric motors 106c-d supply the rotors R3_4 and R4_3. In the event of loss of the electric generator G2, the electric motors 108c-d supply the rotors R3_4 and R4_3, and the electric motors 106e-f supply the rotors R5_6 and R6_5. The electric motors 108e-f supply the rotors R5_6 and R6_5, and the electric motors 106g-g supply the rotors R7_8 and R8_7 in the event of loss of electric generator G3. In the event of a loss of the electric generator G4, the electric motors 108g-h supply the rotors R7_8 and R8_7, and the electric motors 106a-b supply the rotors R1_2 and R2_1.

Figure 4:
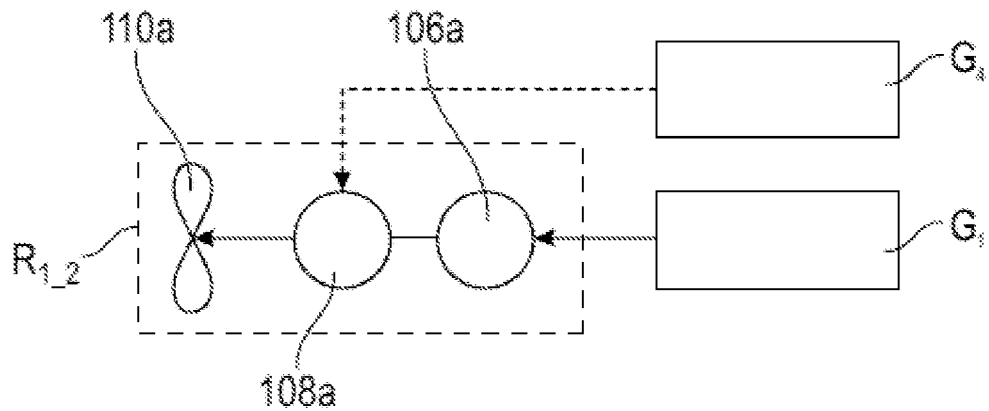
FIG. 4 shows the point of view of a rotor for the dual motor per rotor architecture for an octocopter of FIG. 1.

FIG. 4 shows the architecture from the point of view of a rotor, for example the R1_2 rotor.

The rotor R1_2 is connected to the electric motors 106a, 108a, and in nominal operation is power supplied only by the electric motor 106a. In case of breakdown, i.e., in a degraded situation, the rotor R1_2 is power supplied by the first and second electric motors 106a, 108a. The electric generator G1 supplies the first electric motor 106a, while the electric generator G4 supplies the second electric motor 108a. The electric generators G1 and G4 are segregated. An electric motor is thus supplied by a single electric generator.

The first electric motor 106a operates in an active mode, while the second electric motor 108a operates in a standby mode.

In the event of a breakdown in the architecture, the second electric motor 108a switches to active mode, and thus operates at rated speed. Thus, the rotor R1_2 continues to operate in case of loss of an electric motor or of an electric generator.

The electric motor in standby mode is dimensioned to ensure the robustness of the VTOL application to double electrical breakdown.

The electric motor operating in standby mode is dimensioned to provide the additional power required by the rotor to maintain the force and moment balances of the aircraft. In particular, the second electric motor 108a-h may be adapted to deliver a power between 50% and 80%, in particular around 60%, of the power delivered by the first electric motor 106a-h.

An electric generator can supply a plurality, for example four, of electric motors.

In nominal operation, the electric generator supplies two electric motors in active mode. In the event of a breakdown, the electric generator can supply up to two electric motors in active mode and two electric motors in standby mode switching to active mode. The electric generators supply rotors characterized by their opposite position of central symmetry, and by their opposite direction of rotation. Thus, an electric generator supplies a pair of rotors that are arranged diagonally opposite each other. In the event of breakdown, the power of one electric generator cannot be transferred to other rotors because the electric generators are segregated.

Figure 5:
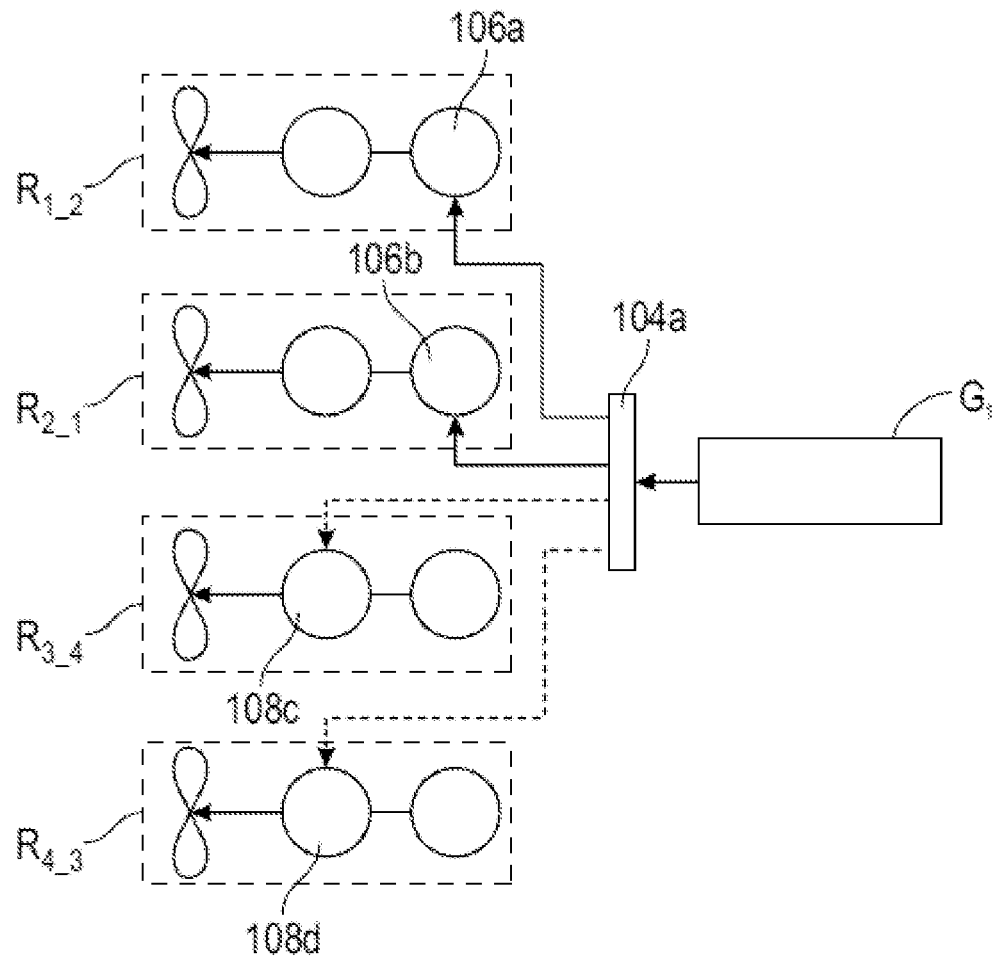
FIG. 5 shows the point of view of a generator for the dual motor per rotor architecture for an octocopter of FIG. 1, The elements having the same functions in the different embodiments have the same references in the figures.

FIG. 5 shows the architecture from the point of view of an electric generator, for example the electric generator G1.

In nominal operation, the electric generator G1 supplies, via the communication bus 104a, the first electric motor 106a in active mode of the rotor R1_2 and the first electric motor 106b in active mode of the rotor R2_1. In the event of a degraded operation, the electric generator G1 supplies, via the communication bus 104a, the second electric motor 108c of the rotor R3_4 and the second electric motor 108d of the rotor R4_3 which switch from the standby mode to the active mode.

The disclosure also relates to a method for controlling the architecture according to the disclosure.

The method comprises, for each rotor R1_2, R2_1, R3_4, R4_3, R5_6, R6_5, R7_8 and R8_7, a step of operating the first electric motor 106a-h of the rotor in an active mode, and a step of operating the second electric motor 108a-h of that rotor in a standby mode.

In the event of a breakdown of an electric motor, of a rotor, or of an electric generator, the method may comprise a step of exiting the standby mode of the second electric motor of all the rotors, and then a step of operating all the second electric motors in an active mode.

For example, in the event of a breakdown of the electric motor 106a of the rotor R1_2, the electric motor 108a is taken out of its standby mode and changes into an active operating mode, to compensate for the loss of the electric motor 106a. In this case, the second electric motors 108b-h are also taken out of their standby mode and change into an active operating mode.

In the event of a loss of the electric generator G1, the electric motors 106a-b are no longer supplied. In this case, the electric motors 108a-b are taken out of their standby mode and change into an active operating mode. The electric motors 108a-b are supplied by the electric generator G4. In this case, the second electric motors 108e-h are also taken out of their standby mode and change into an active operating mode.

The electric propulsion architecture according to the disclosure has been mainly described for an octocopt but can be implemented for a VTOL aircraft comprising a plurality of rotors.

The invention claimed is:

1. An electric propulsion architecture for a multi-rotor vertical take-off and landing aircraft, comprising
   at least four electric generators and
   at least four pairs of rotors,
   each rotor comprising a first electric motor and a second electric motor, the first electric motor being configured to operate in an active mode and the second electric motor being configured to be in a standby mode and being adapted to operate in an active mode in the event of a breakdown of an electric motor of a rotor, of a rotor or of an electric generator,
   for each rotor, a propeller coupled to the first and second electric motors so that during operation the first electric motor drives the propeller,
   wherein for each pair of rotors, a first of the at least four electric generators supplies the first electric motors of the rotors of a pair of rotors, and a second of the at least four electric generators supplies the second electric motors of the rotors of a pair of rotors,
   and wherein the rotors of the pairs of rotors form counter-rotors; and for each counter-rotor, the first and second electric motors of the rotors of each counter-rotor are each supplied by one of the four electric generators so that the four electric generators supply the first and second electric motors of the rotors of each counter-rotor.

2. The architecture according to claim 1, wherein in the event of breakdown of a first electric motor of a rotor, of a rotor, or of an electric generator of the at least four electric generators, the second electric motor of each rotor is configured to operate in an active mode, and wherein, when operating, the first and second electric motors drive the propeller.

3. The architecture according to claim 1, wherein the electric generators comprise at least one battery, or a fuel cell, or a turbogenerator.

4. The architecture according to claim 1, wherein the first and second electric motors of each rotor have different dimensions.

5. The architecture according to claim 1, wherein the rotors of a pair of rotors are arranged diagonally opposite in the aircraft.

6. An electric propulsion architecture for a multi-rotor vertical take-off and landing aircraft, comprising N electric generators, N being an integer greater than or equal to 2, and N pairs of rotors, each rotor comprising a first electric motor and a second electric motor, the first electric motor being configured to operate in an active mode and the second electric motor being configured to be in a standby mode and being adapted to operate in an active mode in the event of a breakdown of an electric motor of a rotor, of a rotor, or of an electric generator, and for each rotor, a propeller coupled to the first and second electric motors so that during operation the first electric motor drives the propeller, wherein for each pair of rotors, a first of the N electric generators supplies the first electric motors of the rotors of one pair of rotors, and a second of the N electric generators supplies the second electric motors of the rotors of one pair of rotors, and wherein the rotors of the pairs of rotors form counter-rotors; and for each counter-rotor, the first and second electric motors of the rotors of each counter-rotor are each supplied by one of the N electric generators so that the N electric generators supply the first and second electric motors of the rotors of each counter-rotor.

7. The architecture according to claim 6, wherein in the event of breakdown of a first electric motor of a rotor, of a rotor, or of an electric generator of the at least four electric generators, the second electric motor of each rotor is configured to operate in an active mode, and wherein, when operating, the first and second electric motors drive the propeller.

8. A multi-rotor vertical take-off and landing aircraft comprising an electric propulsion architecture according to claim 1.

9. A method for operating an electric propulsion architecture for a multi-rotor vertical take-off and landing aircraft according to claim 1, comprising the steps consisting of, for each rotor:

operating the first electric motor in an active mode, and operating the second electric motor in a standby mode.

10. The method according to claim 9, further comprising the step of: in the event of a breakdown of a first electric motor of a rotor, of a rotor, or of an electric generator, exiting operation in standby mode of the second electric motor of each rotor, and then entering operation of the second electric motor of each rotor in an active mode.

* * * * *